US007822608B2

(12) United States Patent
Cross, Jr. et al.

(10) Patent No.: US 7,822,608 B2
(45) Date of Patent: Oct. 26, 2010

(54) DISAMBIGUATING A SPEECH RECOGNITION GRAMMAR IN A MULTIMODAL APPLICATION

(75) Inventors: Charles W. Cross, Jr., Wellington, FL (US); Marc T. White, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 874 days.

(21) Appl. No.: 11/679,274

(22) Filed: Feb. 27, 2007

(65) Prior Publication Data

US 2008/0208590 A1 Aug. 28, 2008

(51) Int. Cl.
G10L 11/00 (2006.01)
G10L 15/18 (2006.01)
G10L 21/00 (2006.01)

(52) U.S. Cl. .................... 704/270; 704/257; 704/275

(58) Field of Classification Search .................. None
See application file for complete search history.

(56) References Cited

U.S. PATENT DOCUMENTS

| 5,577,165 | A | 11/1996 | Takebayashi et al. |
| 5,584,052 | A | 12/1996 | Galau et al. |
| 5,969,717 | A | 10/1999 | Ikemoto |
| 6,208,972 | B1 | 3/2001 | Grant et al. |
| 6,243,375 | B1 | 6/2001 | Speicher |
| 6,275,806 | B1 | 8/2001 | Pertrushin |
| 6,301,560 | B1 | 10/2001 | Masters |
| 6,513,011 | B1 | 1/2003 | Uwakubo |
| 6,606,599 | B2 | 8/2003 | Grant et al. |
| 6,732,078 | B1 * | 5/2004 | Luomi et al. ............ 704/270.1 |

(Continued)

FOREIGN PATENT DOCUMENTS

CN 1385783 12/2002

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

Primary Examiner—Brian L Albertalli
(74) Attorney, Agent, or Firm—Wolf, Greenfield & Sacks, P.C.

(57) ABSTRACT

Disambiguating a speech recognition grammar in a multimodal application, the multimodal application including voice activated hyperlinks, the voice activated hyperlinks voice enabled by a speech recognition grammar characterized by ambiguous terminal grammar elements, including maintaining by the multimodal browser a record of visibility of each voice activated hyperlink, the record of visibility including current visibility and past visibility on a display of the multimodal device of each voice activated hyperlink, the record of visibility further including an ordinal indication, for each voice activated hyperlink scrolled off display, of the sequence in which each such voice activated hyperlink was scrolled off display; recognizing by the multimodal browser speech from a user matching an ambiguous terminal element of the speech recognition grammar; selecting by the multimodal browser a voice activated hyperlink for activation, the selecting carried out in dependence upon the recognized speech and the record of visibility.

18 Claims, 10 Drawing Sheets

U.S. PATENT DOCUMENTS

| | | | |
|---|---|---|---|
| 6,856,960 B1 | 2/2005 | Dragosh et al. | |
| 6,920,425 B1 | 7/2005 | Will et al. | |
| 6,999,930 B1 | 2/2006 | Roberts et al. | |
| 7,035,805 B1 | 4/2006 | Miller | |
| 7,076,425 B2 * | 7/2006 | Ono et al. | 704/252 |
| 7,150,399 B2 | 12/2006 | Barrus et al. | |
| 7,171,243 B2 | 1/2007 | Watanabe et al. | |
| 7,188,067 B2 | 3/2007 | Grant et al. | |
| 7,330,890 B1 | 2/2008 | Partovi et al. | |
| 7,376,586 B1 | 5/2008 | Partovi et al. | |
| 7,487,085 B2 | 2/2009 | Cross | |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Seinel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kujirai | |
| 2005/0075884 A1 | 4/2005 | Badt, Jr. | |
| 2005/0091059 A1 | 4/2005 | Lecoeuche | |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger | |
| 2005/0283367 A1 | 12/2005 | Cross | |
| 2006/0047510 A1 | 3/2006 | Ativanichayaphong et al. | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0005371 A1 * | 1/2007 | Nakagawa et al. | 704/275 |
| 2007/0061132 A1 * | 3/2007 | Bodin et al. | 704/200 |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |
| 2009/0144428 A1 | 6/2009 | Bowater | |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7*th* International Conference On Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U. S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.

* cited by examiner

DISAMBIGUATING A SPEECH RECOGNITION GRAMMAR IN A MULTIMODAL APPLICATION

BACKGROUND OF THE INVENTION

1. Field of the Invention

The field of the invention is data processing, or, more specifically, methods, apparatus, and products for disambiguating a speech recognition grammar in a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V is described in the W3C specification entitled "XHTML+Voice Profile 1.2" of Mar. 16, 2004, as follows:

> The XHTML+Voice profile brings spoken interaction to standard web content by integrating the mature XHTML and XML-Events technologies with XML vocabularies developed as part of the W3C Speech Interface Framework. The profile includes voice modules that support speech synthesis, speech dialogs, command and control, and speech grammars. Voice handlers can be attached to XHTML elements and respond to specific DOM events, thereby reusing the event model familiar to web developers. Voice interaction features are integrated with XHTML and CSS and can consequently be used directly within XHTML content.

X+V provides a markup language that enables users to interact with an multimodal application through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current lightweight voice solutions require a developer to build a grammar and lexicon to limit the potential number of words that an automated speech recognition ('ASR') engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a good level of confidence, recognize the name of the city spoken.

When using a multimodal browser on a multimodal device with a display screen to access dynamic search results on the web, a user often is presented with a list of results which may contain duplicate names. For example, when searching for book stores in Seattle, a user may be presented with multiple locations of a chain book stores, Borders, Barnes & Noble, and so on. On a device with a limited screen size only a fraction of the results may be visible at a time. A search book stores in New York City, for example, may yield a list containing links to several Barnes & Noble book stores.

Speech recognition grammars to voice enable the display of such search results may be dynamically generated by a web server or a browser. Grammars generated from the results being presented on the screen may produce ambiguous results when correlating the matched utterance to the data the user sees on the display. In the Barnes & Noble example, the utterance "barnes and noble" may match grammar elements that voice enable all the links to Barnes & Noble stores in the search results. If grammars are generated in the order the data appears on the display, a prior art speech engine will match the last in a set of duplicates because of the search algorithm in the automatic speech recognition engine—searching from a leaf node up the branches in a grammar tree, for example. If the display has not been scrolled, then the last link to Barnes & Noble is not visible on the display, and the link activated in response to the utterance is not the one visible to user—and therefore unlikely to be the one that the user thought was invoked by the utterance. When this unintended, ambiguous link is invoked, the user confusingly finds that the user is looking at information on some Barnes & Noble store other than the one intended.

SUMMARY OF THE INVENTION

Methods, apparatus, and computer program products are described for disambiguating a speech recognition grammar in a multimodal application, the multimodal application including voice activated hyperlinks, the voice activated hyperlinks voice enabled by a speech recognition grammar characterized by ambiguous terminal grammar elements, the method implemented with the multimodal application operating in a multimodal browser on a multimodal device supporting multiple modes of user interaction with the multimodal device, the modes of user interaction including a voice mode and a visual mode, the multimodal browser operatively coupled to a grammar interpreter, where the methods, apparatus, and computer program products include maintaining by the multimodal browser a record of visibility of each voice activated hyperlink, the record of visibility including current visibility and past visibility on a display of the multimodal device of each voice activated hyperlink, the record of visibility further including an ordinal indication, for each voice activated hyperlink scrolled off display, of the sequence in which each such voice activated hyperlink was scrolled off display; recognizing by the multimodal browser speech from a user matching an ambiguous terminal element of the speech recognition grammar; selecting by the multimodal browser a voice activated hyperlink for activation, the selecting carried out in dependence upon the recognized speech and the record of visibility.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
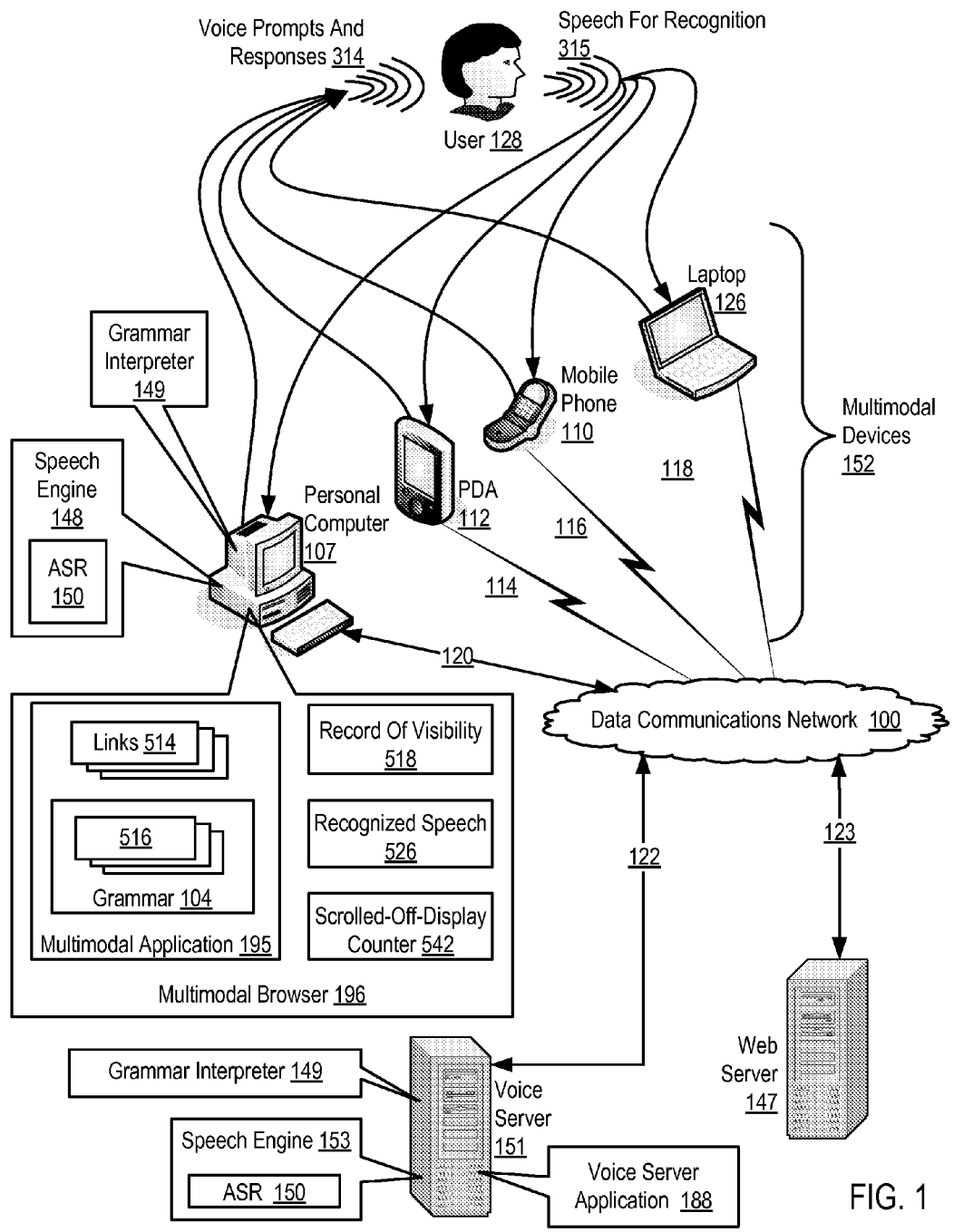
FIG. 1 sets forth a network diagram illustrating an exemplary system for disambiguating a speech recognition grammar in a multimodal application according to embodiments of the present invention.

Exemplary methods, apparatus, and products for disambiguating a speech recognition grammar in a multimodal application according to embodiments of the present invention are described with reference to the accompanying drawings, beginning with FIG. 1. FIG. 1 sets forth a network diagram illustrating an exemplary system for disambiguating a speech recognition grammar in a multimodal application according to embodiments of the present invention. Disambiguating a speech recognition grammar in a multimodal application in this example is implemented with a multimodal application (195) operating in a multimodal browser (196) on a multimodal device (152). The system of FIG. 1 includes at least one speech recognition grammar (104) that specifies words and phrases to be recognized by an automatic speech recognition ('ASR') engine (150) of a speech engine (148, 153). The multimodal application (195) includes voice activated hyperlinks (514), and the voice activated hyperlinks are voice enabled by a speech recognition grammar (104). The speech recognition grammar is characterized by ambiguous terminal grammar elements (516).

The multimodal device (152), the multimodal browser (196), and the multimodal application (195) support multiple modes of user interaction with the multimodal application including a voice mode and one or more non-voice modes of user interaction with the multimodal application. The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The non-voice modes include at least one visual mode in which a user may interact with the multimodal application through mouse or keyboard interaction with a graphical user interface ('GUI'), for example. The multimodal application is operatively coupled (195) to a grammar interpreter (149). The grammar interpreter (149) uses an ASR engine (150) in a speech engine (148) for speech recognition. The operative coupling may be implemented with an application programming interface ('API'), a voice service module, or a VOIP connection as explained in more detail below.

The system of FIG. 1 operates generally to disambiguate a speech recognition grammar in a multimodal application according to embodiments of the present invention by maintaining by the multimodal browser (196) a record of visibility (518) of each voice activated hyperlink, where the record of visibility (518) includes current visibility and past visibility on a display of a multimodal device (152) of each voice activated hyperlink (514). The record of visibility (518) also includes an ordinal indication, for each voice activated hyperlink (514) scrolled off display, of the sequence in which each such voice activated hyperlink was scrolled off display; recognizing by the multimodal browser (196) speech from a user (526) matching an ambiguous terminal element (516) of the speech recognition grammar (104); and selecting by the multimodal browser (196), in dependence upon the recognized speech (526) and the record of visibility (518), a voice activated hyperlink (514) for activation.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled > RTP Payload Format for European Telecommunications Standards Institute (ETSI) European Standard ES 201 108 Distributed Speech Recognition Encoding and the Internet Draft entitled > RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for automatic speech recognition according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal application (195) in this example provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

As shown in FIG. 1, a VoiceXML interpreter (149) may be installed locally in the multimodal device (107) itself, or a VoiceXML interpreter (155) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter provides grammars, speech for recognition, and text prompts for speech synthesis to the speech engine, and the VoiceXML interpreter returns to the multimodal application speech engine output in the form of recognized speech, semantic interpretation results, and digitized speech for voice prompts. In a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and text and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present invention. Each of the example multimodal devices (152) in the system of FIG. 1 may be configured to carry out disambiguating a speech recognition grammar in a multimodal application by installing and running on the multimodal device a multimodal application and a multimodal browser that carries out disambiguating a speech recognition grammar according to embodiments of the present invention.

The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device for disambiguating a speech recognition grammar in a multimodal application according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for disambiguating a speech recognition grammar in a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol, a data communications network layer with the Internet Protocol ('IP'), a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for disambiguating a speech recognition grammar in a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Figure 2:
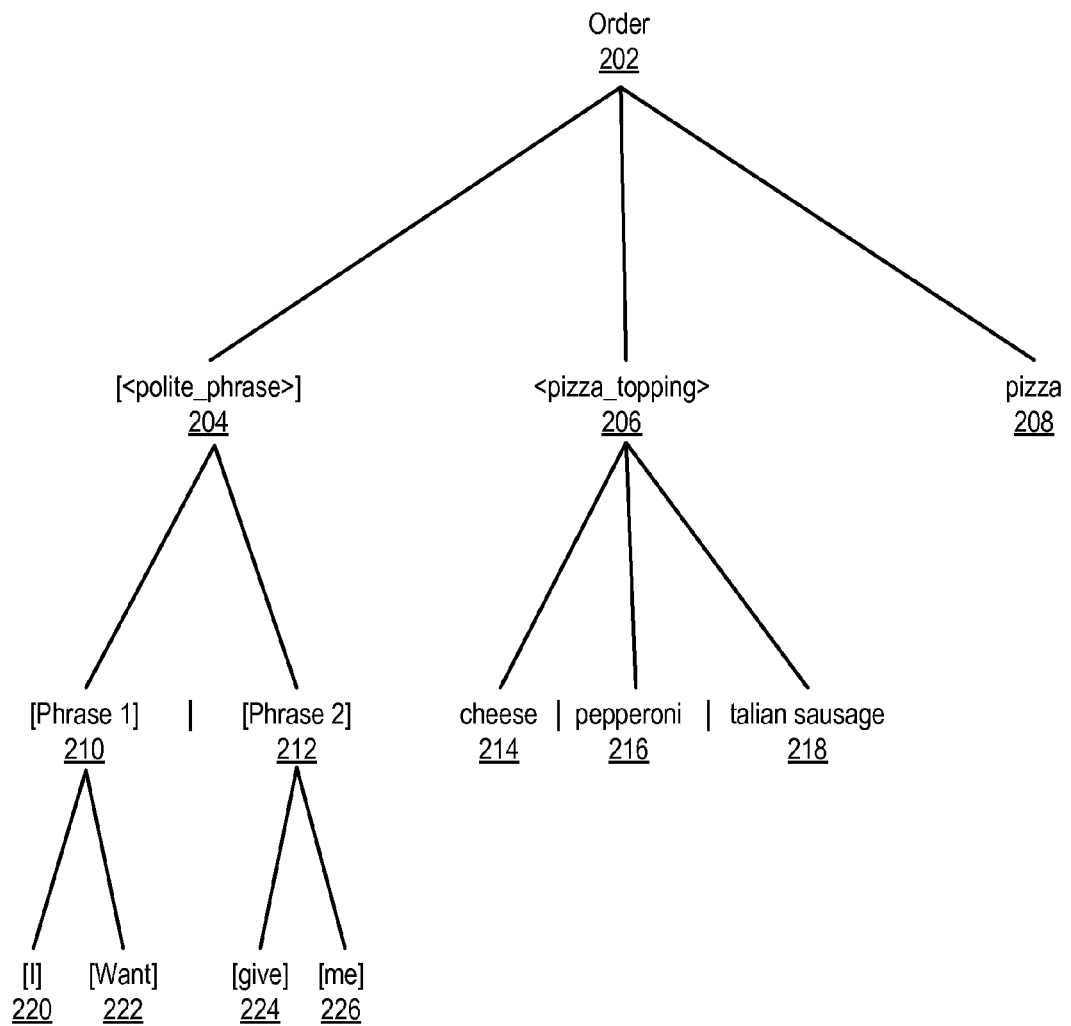
FIG. 2 sets forth a chart illustrating an example speech recognition grammar as a tree structure.

For further explanation of terminal grammar elements, FIG. 2 sets forth a chart illustrating an example speech recognition grammar as a tree structure. The following example is a grammar of a kind that can be disambiguated according to embodiments of the present invention that supports ordering pizza, with the grammar expressed in Java Speech Grammar Format ('JSGF'):

```
order = [<polite_phrase>] <pizza_topping> pizza
pizza_topping = cheese | pepperoni | "italian sausage"
polite_phrase = [I][want] | [give] [me]
```

The example of FIG. 2 maps the elements of the 'order' grammar into a tree structure with the 'order' element (202) at the root of the tree. The terms 'order,' 'pizza_topping,' and 'polite_phrase' specify rules of the grammar. Grammar elements in angled brackets < >, <polite_phrase> (204) and <pizza_topping> (206), are references to rules of the grammar, also called non-terminals, because they represent branch nodes in the tree structure of the grammar that expand into further branch nodes or leaf nodes.

A 'terminal element' is a leaf node in the tree structure of the grammar. 'Pizza' (208) is a non-optional leaf node; if the 'order' grammar is to be matched, the word 'pizza' must be matched with a user utterance. The vertical bars '|' designate grammar elements as alternatives, the use of any one of which will match a grammar element. In the rule <pizza_toppings>, 'cheese' (214), 'pepperoni' (216), and 'italian sausage' (218) are non-optional, alternative terminal elements. If the 'order' grammar is to be matched, the user much speak one of 'cheese,' 'pepperoni,' or 'italian sausage.'

The grammar terms in square brackets [ ] are optional. The square brackets in [<polite_phrase>] designate the 'polite phrase' rule as an optional, non-terminal element, a branch node in the grammar tree. The terms of the <polite phrase> (204) rule in square brackets therefore are 'optional terminals,' leaf nodes in the grammar tree which in this example form two optional alternative phrases (210, 212), each of which is composed of two optional alternative terminals or leaf nodes, respectively: [I] (220) [want] (222) and [give] (224) [me] (226). As explained in more detail below, in addition to being optional or non-optional, terminal grammar elements also may be ambiguous.

Disambiguating a speech recognition grammar in a multimodal application according to embodiments of the present invention in a thin client architecture may be implemented with one or more voice servers, computers, that is, automated computing machinery, that provide speech recognition and speech synthesis. For further explanation, therefore, FIG. 3 sets forth a block diagram of automated computing machinery comprising an example of a computer useful as a voice server (151) in disambiguating a speech recognition grammar in a multimodal application according to embodiments of the present invention. The voice server (151) of FIG. 3 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to carry out automatic speech recognition according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support automatic speech recognition may be implemented in other ways as may occur to those of skill in the art, and all such ways are well within the scope of the present invention.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in automatic speech recognition according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush;
    <when> = today | this afternoon | tomorrow | next week;
]]>
</grammar>
```

In this example, the elements named <command>, <name>, and <when> are rules of the grammar. Rules are a combination of a rulename and an expansion of a rule that advises an ASR engine or a grammar interpreter which words presently can be recognized. In this example, expansion includes conjunction and disjunction, and the vertical bars '|' mean 'or.' An ASR engine or a grammar interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule.

The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). The VoiceXML interpreter interprets VoiceXML dialogs provided to the VoiceXML interpreter by a multimodal application.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 3 are shown in RAM (168), but many components of such software typically are stored in non-volatile memory also, for example, on a disk drive (170).

Figure 3:
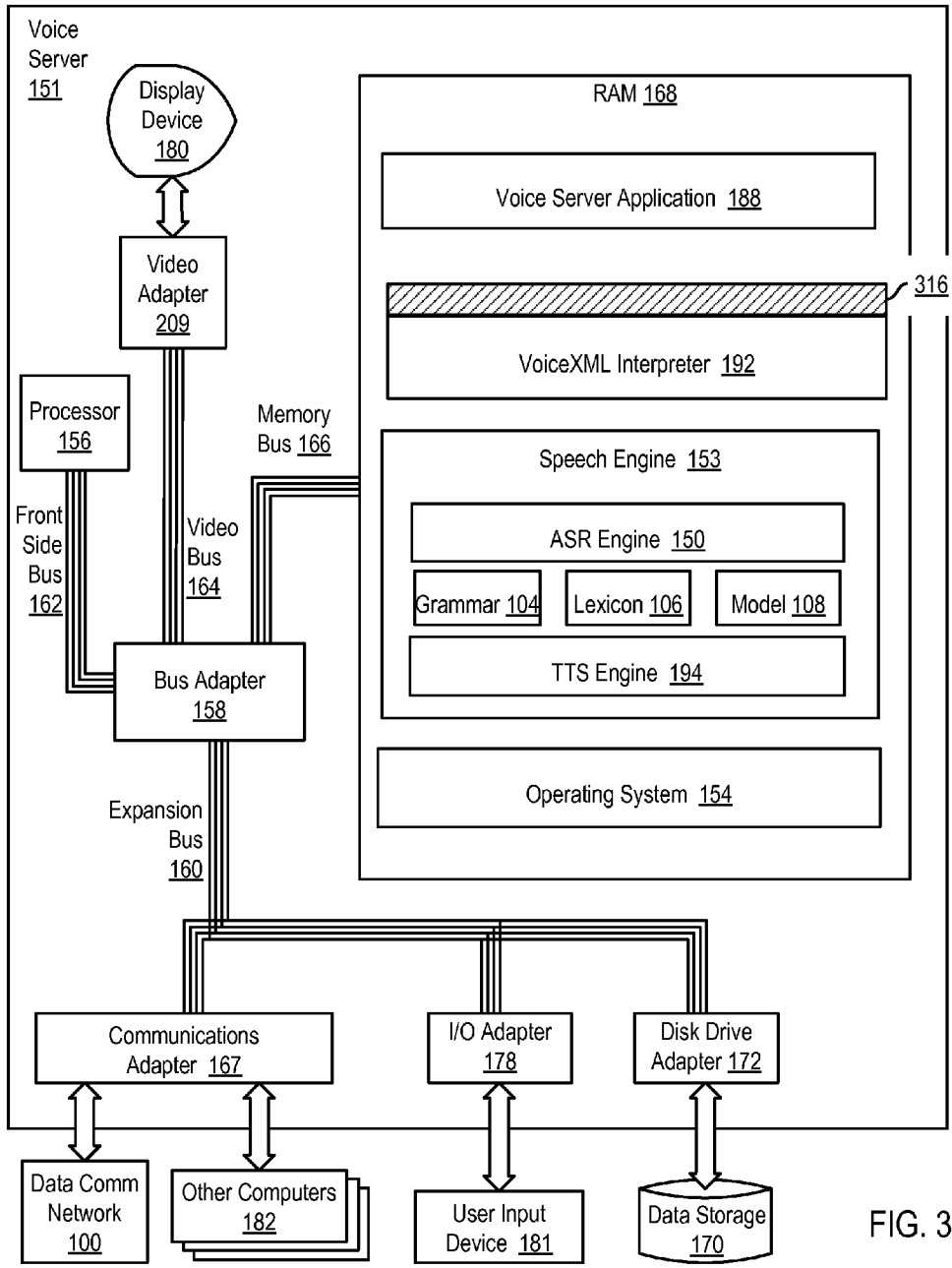
FIG. 3 sets forth a block diagram of automated computing machinery comprising an example of a computer useful as a voice server in disambiguating a speech recognition grammar in a multimodal application according to embodiments of the present invention.

Voice server (151) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 3 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 3 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for disambiguating a speech recognition grammar in a multimodal application according to embodiments of the present invention include modems for wired dial-up communications, Ethernet (IEEE 802.3) adapters for wired data communications network communications, and 802.11 adapters for wireless data communications network communications.

Figure 4:
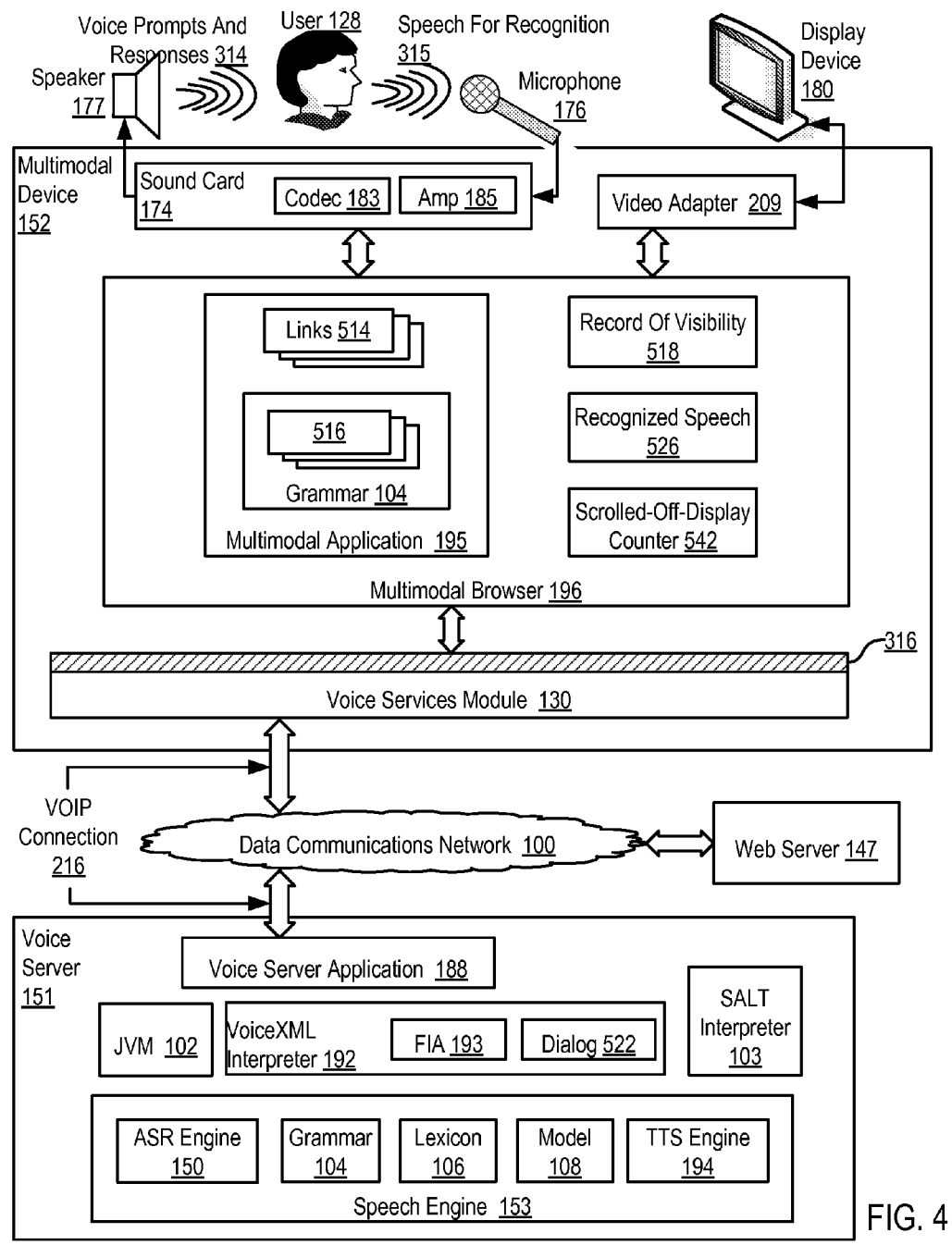
FIG. 4 sets forth a functional block diagram of exemplary apparatus for disambiguating a speech recognition grammar in a multimodal application according to embodiments of the present invention.

For further explanation, FIG. 4 sets forth a functional block diagram of exemplary apparatus for disambiguating a speech recognition grammar in a multimodal application in a thin client architecture according to embodiments of the present invention. The example of FIG. 4 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine ('JVM'), or a multimodal application implemented in other technologies as may occur to those of skill in the art. The multimodal application (195) includes voice activated hyperlinks (514), and the voice activated hyperlinks are voice enabled by a speech recognition grammar (104). The speech recognition grammar is characterized by ambiguous terminal grammar elements (516). The example multimodal device of FIG. 4 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 4 operates in a manner that is similar to the operation of the system of FIG. 3 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The system of FIG. 4 operates generally to disambiguate a speech recognition grammar in a multimodal application according to embodiments of the present invention by maintaining by the multimodal browser (196) a record of visibility (518) of each voice activated hyperlink, where the record of visibility (518) includes current visibility and past visibility on a display of a multimodal device (152) of each voice activated hyperlink (514). The record of visibility (518) also includes an ordinal indication, for each voice activated hyperlink (514) scrolled off display, of the sequence in which each such voice activated hyperlink was scrolled off display; recognizing by the multimodal browser (196) speech from a user (526) matching an ambiguous terminal element (516) of the speech recognition grammar (104); and selecting by the multimodal browser (196), in dependence upon the recognized speech (526) and the record of visibility (518), a voice activated hyperlink (514) for activation.

The multimodal browser (196) is operatively coupled to a grammar interpreter, in this example, a VoiceXML interpreter (192). In this example, the operative coupling between the multimodal browser and the grammar interpreter (192) is implemented with a VOIP connection (216) through a voice services module (130), then through the voice server application (188). The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195) and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 5).

So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from a JVM (not shown), which provides an execution environment for multimodal applications implemented with Java.

Figure 5:
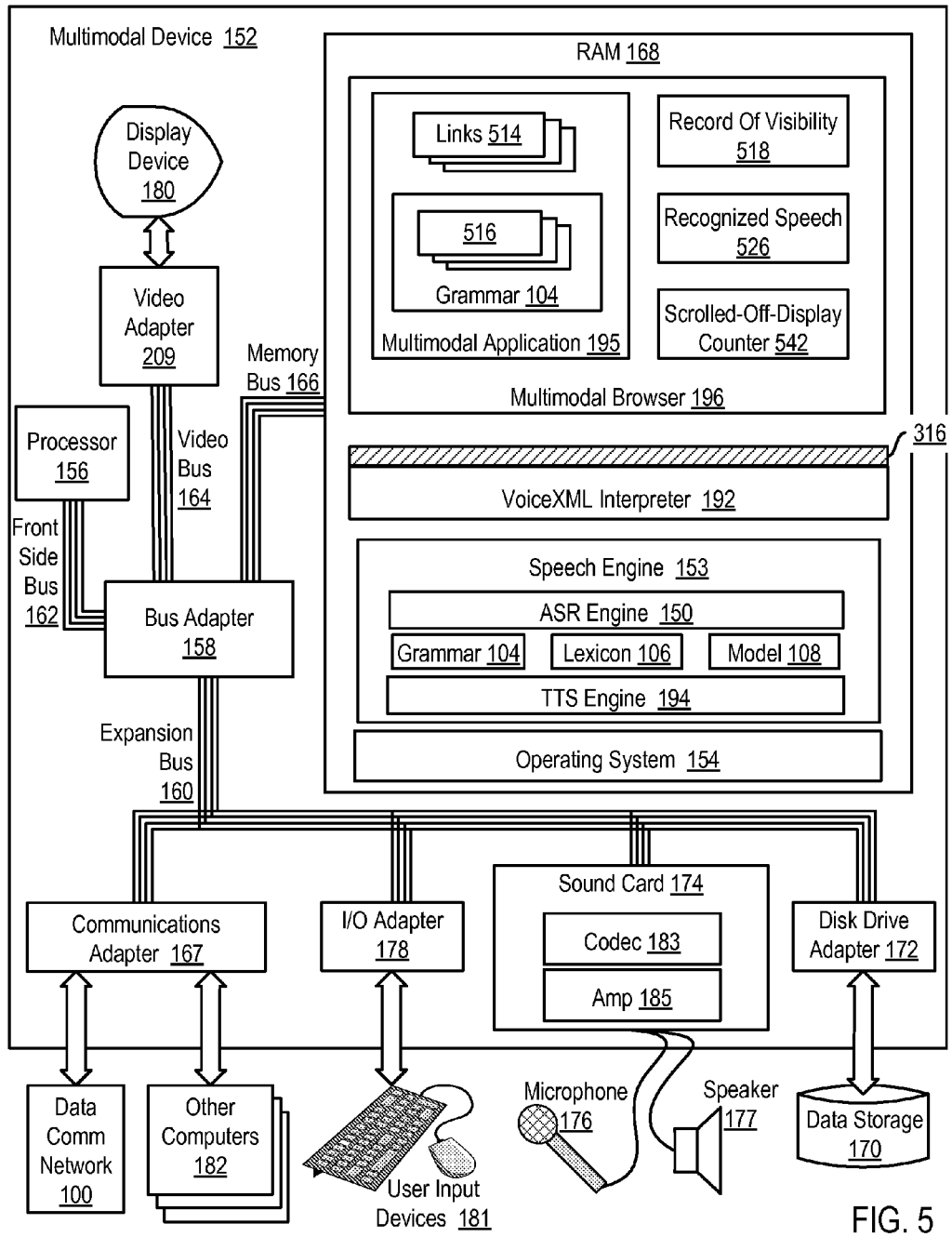
FIG. 5 sets forth a block diagram of automated computing machinery comprising an example of a computer useful as a multimodal device in disambiguating a speech recognition grammar in a multimodal application according to embodiments of the present invention.

Disambiguating a speech recognition grammar in a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 5 sets forth a block diagram of automated computing machinery comprising an example of a computer useful as a multimodal device (152) in disambiguating a speech recognition grammar in a multimodal application according to embodiments of the present invention. In a multimodal device implementing a thick client architecture as illustrated in FIG. 5, the multimodal device (152) has no connection to a remote voice server containing a VoiceXML interpreter and a speech engine. All the components needed for speech synthesis and voice recognition in disambiguating a speech recognition grammar in a multimodal application according to embodiments of the present invention are installed or embedded in the multimodal device itself.

The example multimodal device (152) of FIG. 5 includes several components that are structured and operate similarly as do parallel components of the voice server, having the same drawing reference numbers, as described above with reference to FIG. 3: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 5, the speech engine in the multimodal device of FIG. 3 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for automatic speech recognition according to embodiments of the present invention is IBM's Embedded ViaVoice Enterprise. The example multimodal device of FIG. 5 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports disambiguating a speech recognition grammar in a multimodal application according to embodiments of the present invention. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself. The multimodal application (195) includes voice activated hyperlinks (514), and the voice activated hyperlinks are voice enabled by a speech recognition grammar (104). The speech recognition grammar is characterized by ambiguous terminal grammar elements (516).

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes on Java Virtual Machine (102) and issues calls through the VoiceXML API (316) for speech recognition and speech synthesis services. In further exemplary embodiments, the multimodal application (195) may be implemented as a set or sequence of SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present invention.

In the example system of FIG. 5, the multimodal application (195) and the multimodal browser disambiguate a speech recognition grammar in a multimodal application according to embodiments of the present invention by maintaining by the multimodal browser (196) a record of visibility (518) of each voice activated hyperlink, where the record of visibility (518) includes current visibility and past visibility on a display of a multimodal device (152) of each voice activated hyperlink (514). The record of visibility (518) also includes an ordinal indication, for each voice activated hyperlink (514) scrolled off display, of the sequence in which each such voice activated hyperlink was scrolled off display; recognizing by the multimodal browser (196) speech from a user (526) matching an ambiguous terminal element (516) of the speech recognition grammar (104); and selecting by the multimodal browser (196), in dependence upon the recognized speech (526) and the record of visibility (518), a voice activated hyperlink (514) for activation.

The multimodal application (195) is operatively coupled to the ASR engine (150). In this example, the operative coupling between the multimodal application and the ASR engine (150) is implemented either JVM (102), VoiceXML interpreter (192), or SALT interpreter (103), depending on whether the multimodal application is implemented in X+V, Java, or SALT. When the multimodal application (195) is implemented in X+V, the operative coupling is effected through the multimodal browser (196), which provides an operating environment and an interpreter for the X+V application, and then through the VoiceXML interpreter, which passes grammars and voice utterances for recognition to the ASR engine. When the multimodal application (195) is implemented in Java Speech, the operative coupling is effected through the JVM (102), which provides an operating environment for the Java application and passes grammars and voice utterances for recognition to the ASR engine. When the multimodal application (195) is implemented in SALT, the operative coupling is effected through the SALT interpreter (103), which provides an operating environment and an interpreter for the X+V application and passes grammars and voice utterances for recognition to the ASR engine.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as the functionality for disambiguating a speech recognition grammar in a multimodal application according to embodiments of the present invention—is implemented on the multimodal device itself.

Figure 6:
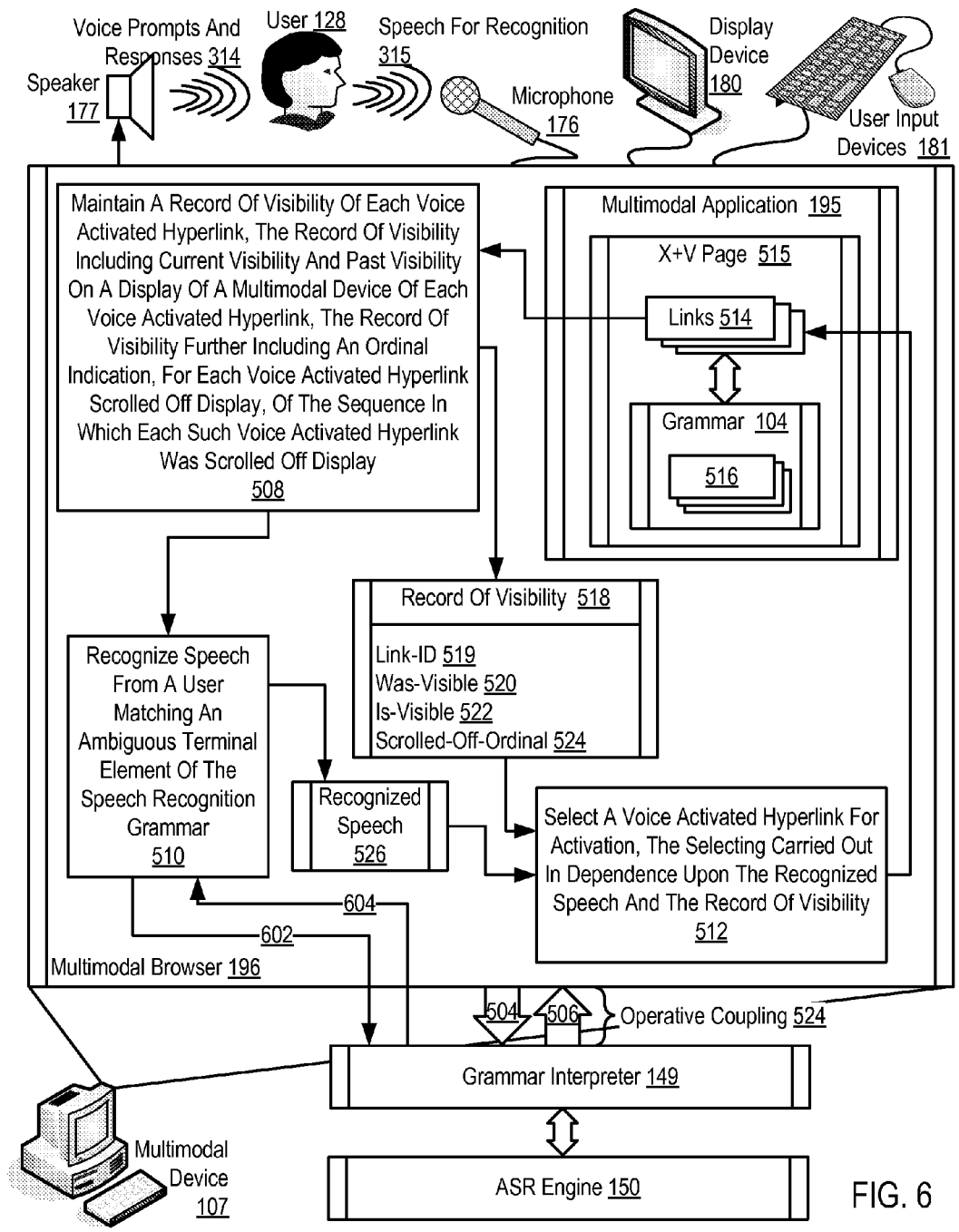
FIG. 6 sets forth a flow chart illustrating an exemplary method of disambiguating a speech recognition grammar in a multimodal application according to embodiments of the present invention.

For further explanation, FIG. 6 sets forth a flow chart illustrating an exemplary method of disambiguating a speech recognition grammar in a multimodal application according to embodiments of the present invention. Disambiguating a speech recognition grammar in this example is implemented with a multimodal application (195) operating in a multimodal browser (196) on a multimodal device (107) supporting multiple modes of user interaction with the multimodal device. The modes of user interaction include a voice mode and a visual mode. The voice mode is represented in this example with audio output through a speaker (177) and audio input through a microphone (176). In the visual mode, a user may interact with the multimodal device (107), the multimodal browser (196), and the multimodal application (195) through mouse or keyboard interaction (181) with a graphical user interface ('GUI'), for example, as may be displayed on the display device (180).

The multimodal application (195) includes voice activated hyperlinks (514), and the voice activated hyperlinks are voice enabled by a speech recognition grammar (104). The speech recognition grammar is characterized by ambiguous terminal grammar elements (516). This pseudocode segment of a multimodal application implemented with X+V, for example:

```
<head>
    <field name="vfield">
        <grammar>
            (1 | Seattle's Best Coffee) {$='link-id-1'} |
            (2 | Tully's Coffee Corporation) {$='link-id-2'} |
            ...
            (11 | Tully's Coffee Corporation) {$='link-id-11'} |
            ...
        <grammar>
        <filled>
            <value expr="document.getElementById(vField).click( )"/>
            ...
        </filled>
    </field>
</head>
<body>
    <a class="tb" href="details.jsp?n=1" id="link-id-1">1. Seattle's Best Coffee</a></b>
    <a class="tb" href="details.jsp?n=2" id="link-id-2">2. Tully's Coffee Corporation</a></b>
    ...
    <a class="tb" href="details.jsp?n=11" id="link-id-11">11. Tully's Coffee Corporation</a></b>
    ...
</body>
``` has three voice activated hyperlinks implemented by the anchor elements identified respectively as "link-id-1," "link-id-2," and "link-id-11." These three voice activated hyperlinks are voice enabled by these grammar rules:

```
(1 | Seattle's Best Coffee) {$='link-id-1'} |
(2 | Tully's Coffee Corporation) {$='link-id-2'} |
...
(11 | Tully's Coffee Corporation) {$='link-id-11'} |
```

The speech recognition grammar set forth in the <grammar> element is characterized by ambiguous terminal grammar elements because the phrase "Tully's Coffee Corporation" matches terminal grammar elements in more than one grammar rule. That is, the phrase matches this terminal grammar element:

(2|Tully's Coffee Corporation){$='link-id-2'}, and also matches this terminal grammar element:

(11|Tully's Coffee Corporation){$='link-id-11'}.

The multimodal browser (196) is operatively coupled (524) to a grammar interpreter (149). The operative coupling (524) provides a data communications path (504) from the multimodal browser (196) to the grammar interpreter for speech recognition grammars (104) and speech input. The operative coupling (524) provides a data communications path (506) from grammar interpreter (149) to the multimodal browser (196) for return of recognized speech (526) and semantic interpretation results. The grammar interpreter may be, for example, a SALT interpreter or a VoiceXML interpreter. The operative coupling may be effected, for example, with an API (316 on FIG. 5) into a VoiceXML interpreter (192 on FIG. 5) when the multimodal application is implemented in a thick client architecture. When the multimodal application is implemented in a thin client architecture, the operative coupling may include a voice services module (130 on FIG. 4) and a VOIP connection (216 on FIG. 4). When the multimodal application (195) is implemented in X+V, the operative coupling may include a VoiceXML interpreter (192 on FIG. 4). When the multimodal application is implemented in a Java speech framework, the operative coupling may include a Java speech API and a JVM. When the multimodal application is implemented in SALT, the operative coupling may include a SALT interpreter.

Figure 7:
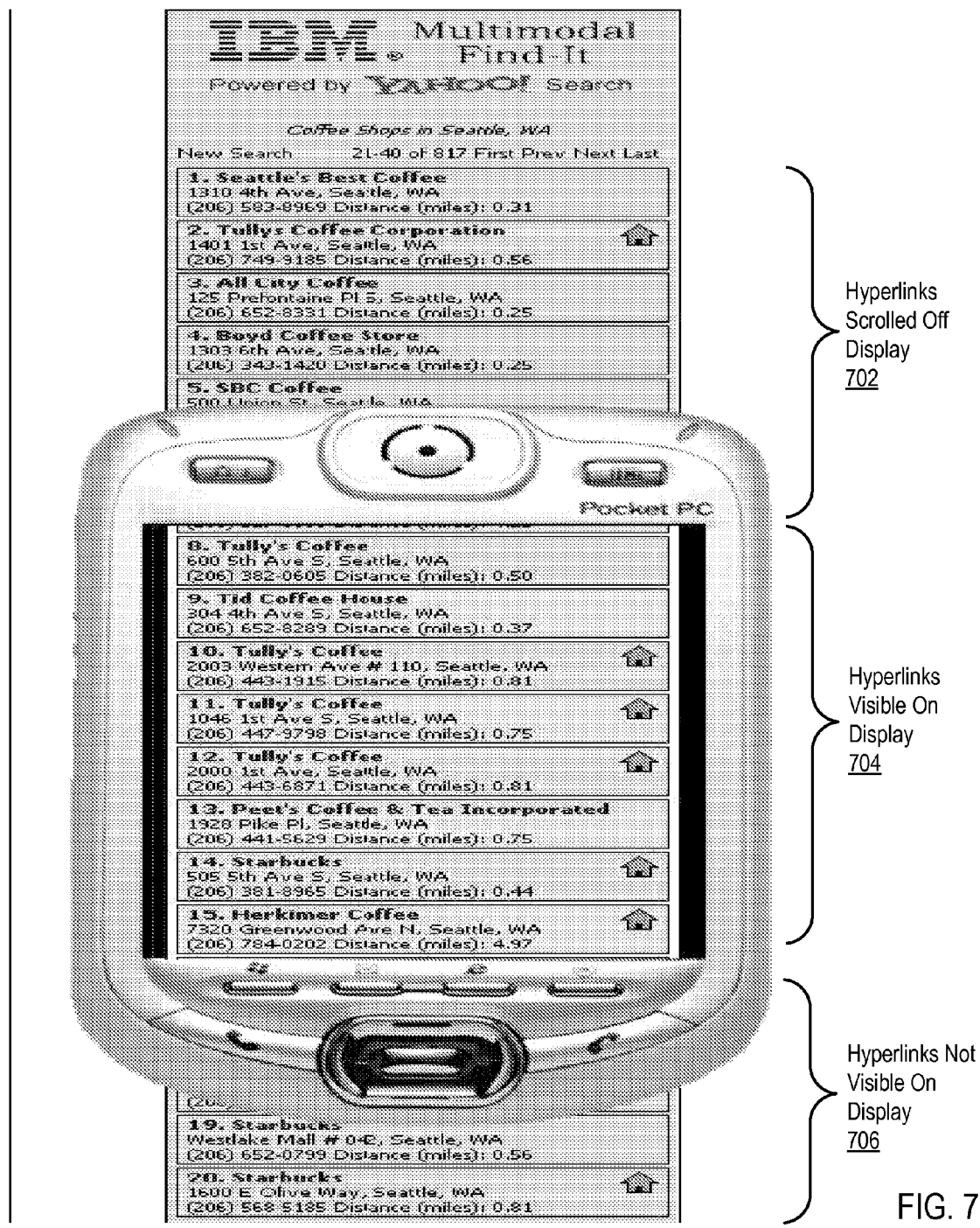
FIG. 7 illustrates a GUI screen for visual input to a multimodal application according to embodiments of the present invention.

The method of FIG. 6 is explained with reference to FIG. 6, of course, and it is also explained with reference to FIG. 7 and to the computer program listing set forth at the end of this specification just before the claims. FIG. 7 illustrates a example display of voice activated hyperlinks to be disambiguated according to embodiments of the present invention by a multimodal browser operating a multimodal application on a multimodal device. In the example of FIG. 7, the multimodal device is represented as a Pocket PC™, a handheld device that would typically run the Windows CE™ operating system. In the example of FIG. 7, a user has navigated a browser to a Yahoo™ search for coffee shops in Seattle, Wash. The search has returned a set of 20 descriptions of coffee shops in Seattle, Wash., each of which is displayed with a voice enabled hyperlink. At the point in the user's operation of the multimodal device illustrated in FIG. 7, the first seven voice enabled hyperlinks (702) have been scrolled vertically off the display screen of the multimodal device, the voice enabled hyperlinks numbered 6-15 (704) are visible on the display screen, and the voice enabled hyperlinks numbered 16-20 (706) are not visible on the display. The voice enabled hyperlinks numbered 16-20 (706) may be off display because they have never been scrolled on or because they were previously scrolled on and then scrolled back off again.

The computer program listing set forth at the end of this specification just before the claims is a pseudocode listing of a example X+V page of a multimodal application that disambiguates a speech recognition grammar according to embodiments of the present invention. The computer program listing is termed a 'pseudocode listing' because it is an explanation presented in the form of computer code rather than a working model of a computer program. The example X+V page is a page that may be returned from a browser query regarding coffee shops in Seattle, Wash., like the query described with reference to FIG. 7. The example X+V page when executed in a browser may generate a display of voice enabled hyperlinks like the one illustrated in FIG. 7. In this specification, therefore, the display of FIG. 7 and the example X+V page in the computer program listing are referred to generally as 'the coffee shops example.'

The method of FIG. 6 includes maintaining (508) by the multimodal browser a record of visibility (518) of each voice activated hyperlink (516). The record of visibility may be implemented as any appropriate data structure as may occur to those of skill in the art, a list, a linked list, a C structure, a C++ class, an array of structures, a record in a table, and so on. In this example, the record of visibility (518) including current visibility and past visibility on a display of the multimodal device of each voice activated hyperlink, implemented respectively as Boolean data elements named 'Is-Visible' (522) and 'Was-Visible' (520). The Boolean data element have a value of TRUE or FALSE. For Is-Visible, TRUE indicates that a voice activated hyperlink whose visibility is represented by a record of visibility is currently visible on a display screen of a multimodal device, and FALSE indicates that the voice activated hyperlink is not visible—either because it has never been scrolled on to the display or because it was previously visible and was scrolled off the display. For the Boolean data element Was-Visible, the value TRUE indicates that a voice activated hyperlink was previously visible on the display, and FALSE indicates that a voice activated hyperlink was not previously visible on the display.

The record of visibility (518) also includes an ordinal indication, for each voice activated hyperlink scrolled off display, of the sequence in which each such voice activated hyperlink was scrolled off display, implemented here as an integer field named 'Scrolled-Off-Display' (524). That is, Scrolled-Off-Display takes ordinal values, 0, 1, 2, 3, and so on, where the value zero may be taken as an indication that a voice activated hyperlink is visible. Other values may be taken from a scrolled-off-display counter indicating the sequence in which a voice activated hyperlink was scrolled off display. The record of visibility also includes a foreign key field named 'Link-ID' (519) that identifies the voice activated hyperlinks whose visibility and history are represented in the record.

In the method of FIG. 6 the multimodal application (195) includes an X+V page (515) that includes the voice activated hyperlinks (514). That is, in this example, the multimodal application is implemented as an X+V application. The implementation with X+V is for ease of explanation, not a limitation of the invention. The multimodal application may be implemented in any technology as will occur to those of skill in the art, including, for example, Java or SALT. When the multimodal application is implemented with X+V, each voice activated hyperlink (514) may include an XHTML anchor element bound to a terminal element of the grammar (104) by a value of an identifying attribute of the anchor element, where the value of the identifying attribute is unique within an X+V page. An example of such a hyperlink from the coffee shops example is the hyperlink implemented by following anchor element:

<a class="tb"href="details.jsp?n=1"id="link-id-1">1. Seattle's Best Coffee</a>, that is bound by the identifying attribute id="link-id-1" to the following terminal element of the grammar from the coffee shops example:

(1|Seattle's Best Coffee){$='link-id-1'}

Similarly, this hyperlink from the coffee shops example:

---

<a class="tb" href="details.jsp?n=2" id="link-id-2">2. Tully's Coffee Corporation</a>

--- is bound by the identifying attribute id="link-id-2" to this terminal grammar element:

(2|Tully's Coffee Corporation){$='link-id-2'}.

This hyperlink from the coffee shops example:

<a class="tb"href="details.jsp?n=3"id="link-id-3">3. All City Coffee</a> is bound by the identifying attribute id="link-id-3" to this terminal grammar element:

(3|All City Coffee){$='link-id-3'}.

And so on—throughout the coffee shops example.

The method of FIG. 6 also includes recognizing (510) by the multimodal browser (196) speech (526) from a user matching an ambiguous terminal element of the speech recognition grammar. In the coffee shops example, the utterance "Tully's Coffee" matches an ambiguous terminal element of a speech recognition grammar because "Tully's Coffee" matches grammar elements that voice enable both hyperlink 11 and hyperlink 12 in the coffee shops example. In the coffee shops example, the utterance "Starbucks" matches an ambiguous terminal element of a speech recognition grammar because "Starbucks" matches grammar elements that voice enable both hyperlink 19 and hyperlink 20 in the coffee shops example.

In the method of FIG. 6, the speech recognition process (510) provides (602) user utterances to a grammar interpreter and receives (604) recognized speech back in return. The return is in the form of a semantic interpretation result accessible by ECMAScript as application.lastresult$.interpretation. The semantic interpretation contains the identification of one of the voice activated hyperlinks, 'link-id-1,' 'link-id-2,' and so on, depending on which grammar element was matched in the grammar interpreter. If the identification the voice enabled hyperlink is 'link-id-11,' then the match is ambiguous, because the voice utterance can have been "Tully's Coffee," and that utterance can activate either voice activated hyperlink 11 or voice activated hyperlink 12.

In the coffee shops example, it is the multimodal application in the form of the example X+V page in the computer program listing that determines through the script identified as id="clickSelection( )" that a voice activated hyperlink is voice enabled by an ambiguous terminal grammar element. The clickSelection( ) script obtains the identification of the voice enabled hyperlink identified by speech recognition from application.lastresult$.interpretation and compares the text of the recognized speech from application.lastresult$.utterance to the text of each terminal grammar element. Matches may be recorded in a temporary list. If at the end of the comparison process there are one or more entries in the temporary list, then the recognized speech has matched an ambiguous terminal grammar element.

The method of FIG. 6 also includes selecting (512) by the multimodal browser (196) a voice activated hyperlink (514) for activation, the selecting carried out in dependence upon the recognized speech and the record of visibility. The recognized speech matches a grammar with ambiguous terminal elements—so that two or more voice activated hyperlinks are voice enabled by grammar elements matched by the recognized speech. Only one hyperlink can be activated; which one should it be? In the coffee shops example, the recognized speech "Starbucks" voice enables at least three hyperlink, numbers 14, 19, and 20. Only hyperlink number 14 is currently visible on the display of FIG. 7, however. So one way to select among the three ambiguous hyperlinks, when two are not visible and only one is visible, is to select the visible one. A user who speaks "Starbucks" apparently is looking at the display screen and may be presumed to be attempting to activate the hyperlink that the user sees rather than one of the ambiguous hyperlinks that the user cannot see. Selecting a voice activated hyperlink for activation is explained in more detail below with reference to FIG. 9.

Figure 8:
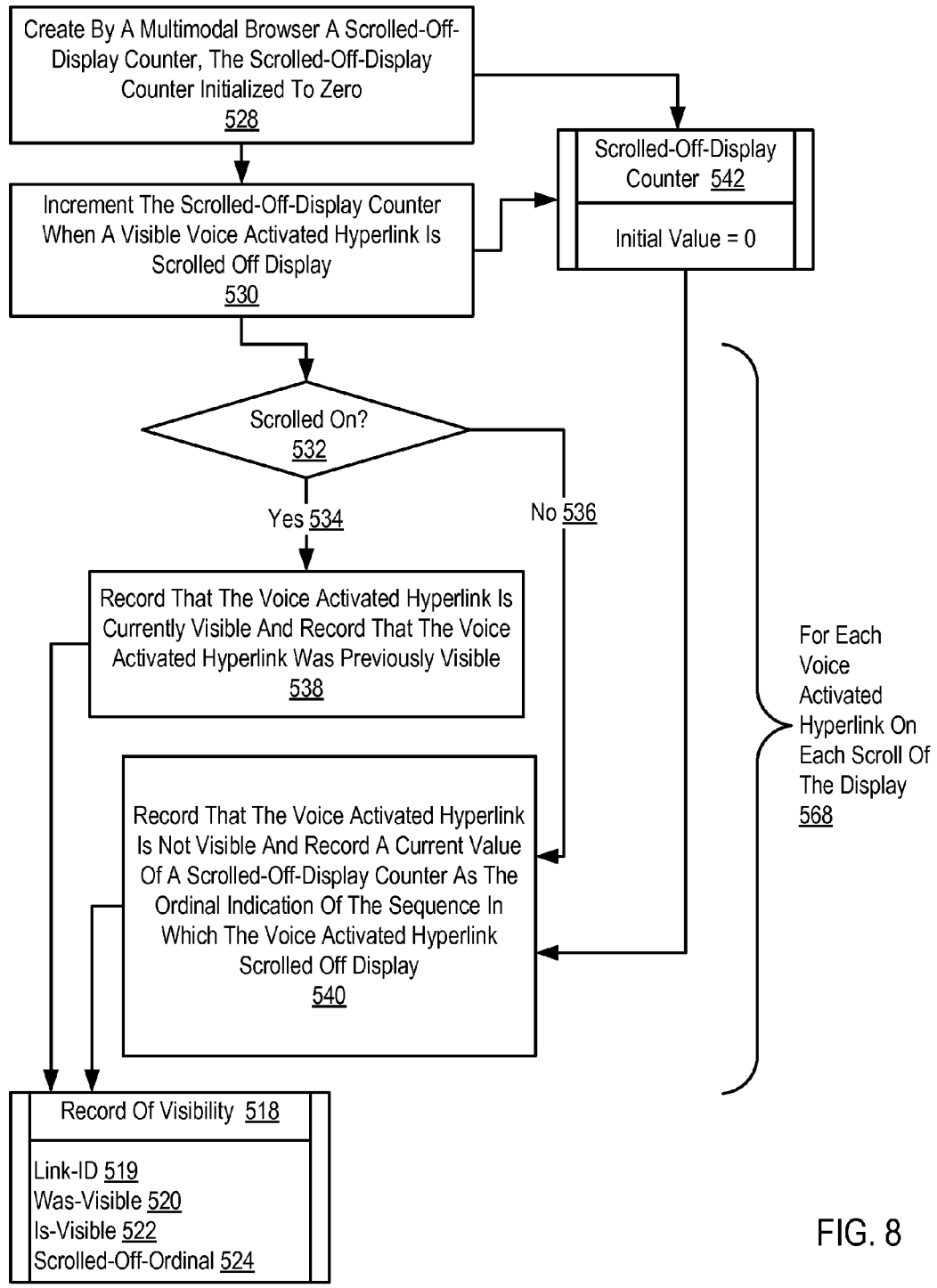
FIG. 8 sets forth a flow chart illustrating an exemplary method of maintaining a record of visibility according to embodiments of the present invention.

For further explanation, FIG. 8 sets forth a flow chart illustrating an exemplary method of maintaining a record of visibility according to embodiments of the present invention, where the record of visibility includes an ordinal indication, for each voice activated hyperlink scrolled off display, of the sequence in which each such voice activated hyperlink was scrolled off display. In this example, the ordinal indication of the sequence in which voice activated hyperlinks are scrolled off display is implemented as the data element Scrolled-Off-Display (524) in the record of visibility (518), and the value of the ordinal indication is set by use of a scrolled-off-display counter (542). The method of FIG. 8 includes a multimodal browser's creating (528) the scrolled-off-display counter (542), with the scrolled-off-display counter initialized to zero. The scrolled-off-display counter may be implemented, for example, as a variable stored in computer memory. The method of FIG. 8 also includes incrementing (530) the scrolled-off-display counter when a visible voice activated hyperlink is scrolled off display.

The method of FIG. 8 maintains a record of visibility by carrying out the following steps for each voice activated hyperlink on each scroll of the display (568): If the voice activated hyperlink scrolled into visibility on the display (534), recording (538) that the voice activated hyperlink is currently visible and recording that the voice activated hyperlink was previously visible. That is, if the voice activated hyperlink scrolled onto the display on a multimodal device, for the record of visibility identified by the hyperlink's Link-ID (519), set Is-Visible (522) to TRUE and set Was-Visible (520) to true. Alternatively, in an embodiment where the value zero in the Scrolled-Off-Ordinal (524) is taken as an indication of visibility, set the value of Scrolled-Off-Display to zero, thereby indicating current visibility of the hyperlink on a display screen.

In the method of FIG. 8, if a voice activated hyperlink scrolled out of visibility off the display (536), the method proceeds by recording (540) that the voice activated hyperlink is not visible and recording a current value of the scrolled-off-display counter as the ordinal indication of the sequence in which the voice activated hyperlink scrolled off display. Recording that the voice activated hyperlink is not visible and recording a current value of the scrolled-off-display counter as the ordinal indication of the sequence in which the voice activated hyperlink scrolled off display may be carried out in embodiments that use a zero value of Scrolled-Off-Ordinal (524) to indicate visibility by setting the value of Scrolled-Off-Ordinal to the current value of the scrolled-off-display counter (542). The scrolled-off-display counter (542) is incremented every time a visible voice activated hyperlink is scrolled off display, so its value is always a unique indication of the sequence in which a hyperlink is scrolled off display. Recording that the voice activated hyperlink is not visible also may be carried out by setting Is-Visible (522) to FALSE, for use, for example, in embodiments that do not take a zero value of the Scrolled-Off-Display to indicate visibility. The coffee shops example uses this pseudocode script to record visibility of voice activated hyperlinks on each scroll of the display:

```
<script id="onScroll" declare="declare" type="text/javascript"> /*
    For each voice activated hyperlinik:
    Determine whether the link is visible
    if the link is visible, set was-visible true and clear the scrolled past field
    if the link is not visible:
    if was-visible true and, and scrolled-off-ordinal = 0
    set scrolled-off-ordinal = scrolled-off-display-counter
    increment scrolled-off-display-counter
</script>
```

Other ways of recording indications of visibility and past visibility will occur to those of skill in the art, and all such ways are well within the scope of the present invention.

Figure 9:
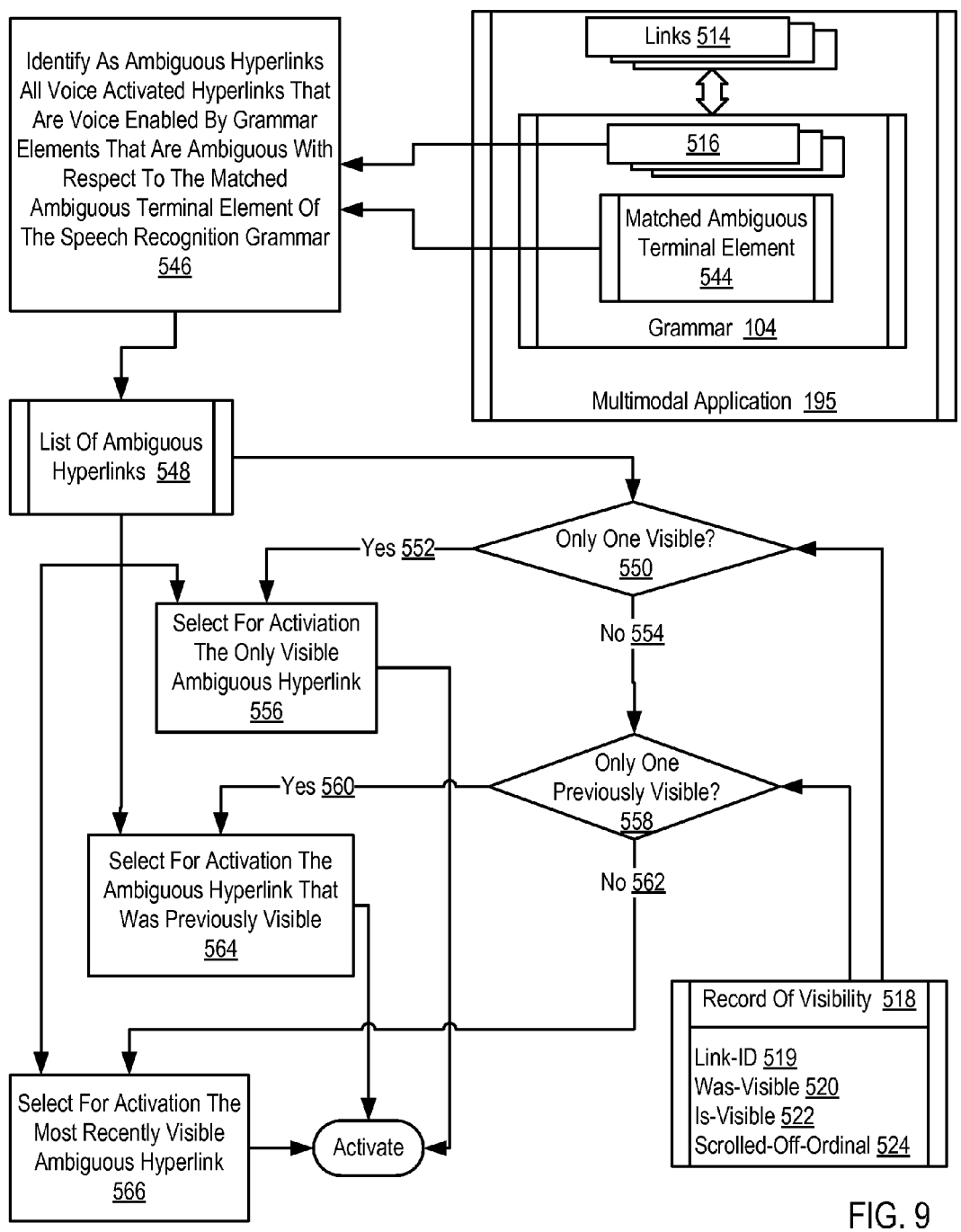
FIG. 9 sets forth a flow chart illustrating an exemplary method of selecting a voice activated hyperlink for activation according to embodiments of the present invention.

For further explanation, FIG. 9 sets forth a flow chart illustrating an exemplary method of selecting a voice activated hyperlink for activation according to embodiments of the present invention. In the method of FIG. 9, a multimodal browser's selecting a voice activated hyperlink for activation includes identifying (546) as ambiguous hyperlinks all voice activated hyperlinks that are voice enabled by grammar elements that are ambiguous with respect to the matched ambiguous terminal element of the speech recognition grammar. In the coffee shops example, when any of these grammar elements are matched:

(14|Starbucks){$='link-id-14'}
  (19|Starbucks){$='link-id-19'}
  (20|Starbucks){$='link-id-20'} are the matched element is ambiguous with respect to the other two. Given recognized speech of "Starbucks" assigned by a grammar interpreter as a match to link-id-20, the user may very well have intended to activate link-id-14, the one that is actually visible on the display screen on FIG. 7. These voice activated hyperlinks are voice enabled by the above ambiguous terminal grammar elements:

(14|Starbucks){$='link-id-14'}
  (19|Starbucks){$='link-id-19'}
  (20|Starbucks){$='link-id-20'}

These hyperlinks are considered 'ambiguous hyperlinks' because they are voice enabled by grammar elements that are ambiguous with respect to a matched ambiguous terminal grammar element—when the match is to "Starbucks."

In the method of FIG. 9, a multimodal browser's selecting of a voice activated hyperlink for activation is carried out by selecting (556) for activation the only visible ambiguous hyperlink, if only one ambiguous hyperlink is visible (552). In the method of FIG. 9, a multimodal browser's selecting a voice activated hyperlink for activation includes selecting (564) for activation the ambiguous hyperlink that was previously visible, if no ambiguous hyperlink is visible (554) and only one ambiguous hyperlink was previously visible (560). In the method of FIG. 9, a multimodal browser's selecting a voice activated hyperlink for activation also includes selecting (566) for activation the most recently visible ambiguous hyperlink, if no ambiguous hyperlink is visible (554) and more than one ambiguous hyperlink was previously visible (562).

For a further example of selecting a voice activated hyperlink for activation, the pseudocode script clickSelection( ) in the coffee shops example carries out selecting a voice activated hyperlink for activation according to embodiments of the present invention as follows:

```
<script id="clickSelection( )" declare="declare" type="text/javascript"> /*
    obtain the id of the link identified by speech recognition from
    application.lastresult$.interpretation
    determine whether the returned link is ambiguous:
        for each terminal grammar element compare the text of the element
        to application.lastresult$.utterance
        if true, add the element to a temporary duplicate list
        if the returned link is not ambiguous (that is, the temporary duplicate
        list is empty), select it and activate it: that is, click the link identified
        by speech recognition
        if the returned link is ambiguous (that is, the temporary duplicate list
        is not empty):
            determine whether the link identified by speech recognition is
            currently visible to the user (on the display screen) - by calling the
            function isVisible(e) set forth below, for example ...
            if the link identified by speech recognition is visible:
                determine whether any other ambiguous links are visible,
                if no other ambiguous links are visible, select and activate the
                    returned link, that is, that is, click it
            if the returned link is not visible:
                determine whether any other ambiguous links are visible,
                if yes, select and activate (click) the top one
                if no, look in the visibility record and select and activate (click) the
                last ambiguous link that was visible, that is, the link in the
                temporary duplicate list having the largest scrolled-off-ordinal
</script>
```

Other ways of selecting a voice activated hyperlink for activation will occur to those of skill in the art, and all such ways are well within the scope of the present invention.

Several of the example methods described in this specification make use of determinations of visibility of voice activated hyperlinks. The method of FIG. 9, for example, includes a determination (550) whether only one of the ambiguous hyperlinks (548) is visible. The method of FIG. 8 includes incrementing (530) a scrolled-off-display counter when a visible voice activated hyperlink is scrolled off display—a method step that may include determining whether a particular voice activated hyperlink is visible and, if it is not visible, determining that the hyperlink was just scrolled off display by a scroll event because the record of visibility (518, 522) still records the hyperlink as visible. The method of FIG. 8 also includes a determination (532) whether a voice activated hyperlink was scrolled on display by a scroll event—a method step that may include determining whether a particular hyperlink is visible and, if it is visible, determining that the hyperlink was just scrolled on display because the record of visibility (518, 522) still records the hyperlink as not visible. For further explanation, therefore, FIG. 10 sets forth a block diagram of a visible area (612) of a GUI window on a display screen that includes a voice activated hyperlink (514) that is taken for purposes of explanation as an ambiguous hyperlink according to embodiments of the present invention. An example method of determining whether a hyperlink is visible is explained with reference to FIG. 10 and the following ECMAScript functions, named "isVisible(e)" and getAbsoluteTop(e), from the coffee shops example:

```
<script language="Javascript" type="text/javascript" >
    function isVisible(e) {
        var top = getAbsoluteTop(e);
        if (top >= window.window.pageYOffset &&
        top <= window.window.pageYOffset + window.innerHeight -
        e.height)
            return true;
        else
            return false;
    }
    // The offset of an element is relative to its parent
    // so must sum the offsets of the parent hierarchy.
    function getAbsoluteTop( e ) {
        var t = e.offsetTop;
        var p = e.offsetParent;
        while (p) {
            t += p.offsetTop;
            p = p.offsetParent;
        }
        return t;
    }
</script>
```

Figure 10:
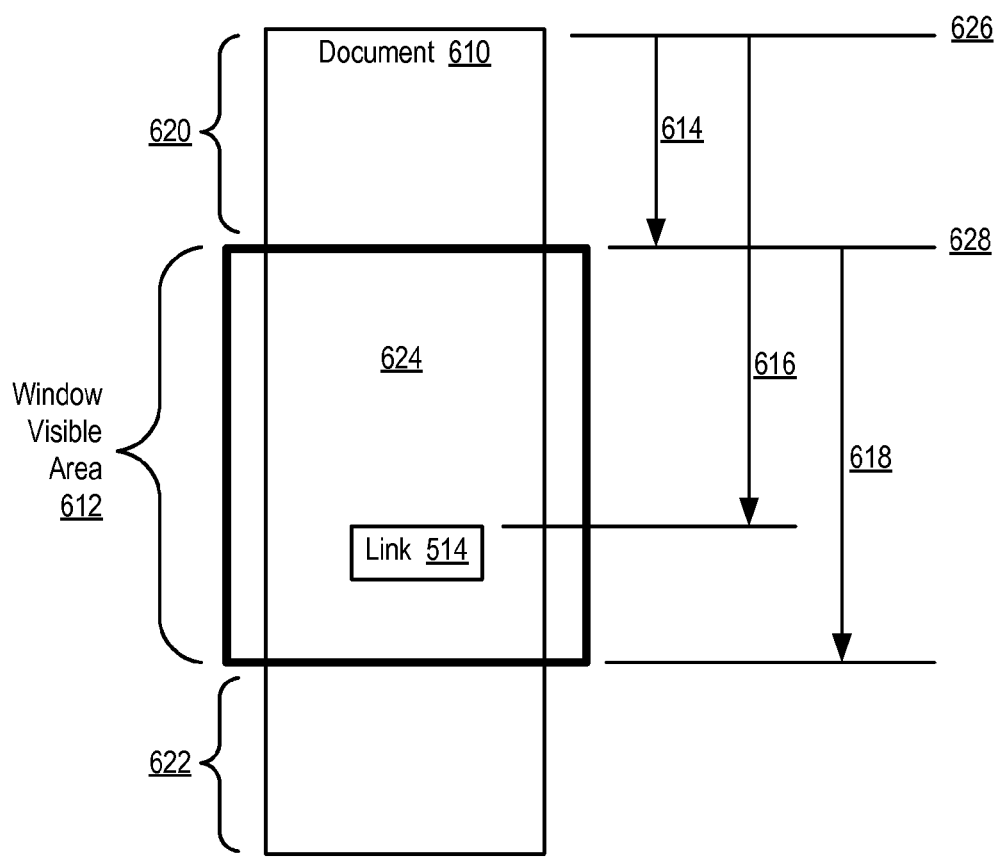
FIG. 10 sets forth a block diagram of a visible area of a GUI window on a display screen that includes a voice activated hyperlink that is taken for purposes of explanation as an ambiguous hyperlink according to embodiments of the present invention.

The example of FIG. 10 includes a document (610) portion of a multimodal application on display. Such a document may be an X+V page, for example. In the example of FIG. 10, a portion (624) of the document is visible in the window display area (612), and portions (620, 622) of the document are not visible, either because they have never been scrolled onto the visible portion of the display or because they were previously visible and have been scrolled off display. The example of FIG. 10 takes as a reference the top (626) of the document (610) on display. Display locations within the document (610) are characterized by the Y offset (614) in the document of the top (628) of the visible area of the window, the absolute top offset (616) of the hyperlink (514) from the top of the document, and the inner height (618) of the visible area of the window.

The method illustrated by the isVisible(e) function includes determining absolute top offset (616 on FIG. 10) of the hyperlink with a call to the getAbsoluteTop(e) function. The hyperlink often is implemented with a markup element such as an anchor element of an X+V page, for example, so the script functions isVisible(e) and getAbsoluteTop(e) use 'e' for 'element' as a reference to the hyperlink. When a multimodal browser loads a document such as an X+V page, the multimodal browser creates a document object model ('DOM') that includes an object representing each identified element in the document, with the objects arranged hierarchically. The browser typically then manipulates the hyperlink (514) as an object embedded at some location in the hierarchy. The function getAbsoluteTop(e) steps through the hierarchy of objects in the DOM and sums their offsets from the top of the document to derive the absolute top offset (616) of the hyperlink element with respect to the top (626) of the document (610). The isVisible(e) function concludes that the hyperlink is visible if its absolute offset (616) from the top of the document is greater than the offset (614) of the top of the window visible area and less than the offset (614) of the top of the window visible area plus the inner height (618) of the window visible area.

Exemplary embodiments of the present invention are described largely in the context of a fully functional computer system for disambiguating a speech recognition grammar in a multimodal application. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

COMPUTER PROGRAM LISTING

```
<?xml version="1.0" encoding="ISO-8859-1" ?>
<!DOCTYPE html PUBLIC "-//VoiceXML Forum//DTD XHTML+Voice 1.2//EN"
"http://www.voicexml.org/specs/multimodal/x+v/12/dtd/xhtml+voice12.dtd">
<html xmlns="http://www.w3.org/1999/xhtml"
xmlns:vxml="http://www.w3.org/2001/vxml" xmlns:ev="http://www.w3.org/2001/xml-
events" xmlns:xv="http://www.voicexml.org/2002/xhtml+voice" xml:lang="en-US">
<head>
    <title>Yahoo! 411 - Results</title>
    <link rel="stylesheet" type="text/css" href="res/cmn/results.css"/>
    <form xmlns="http://www.w3.org/2001/vxml" id="vForm">
        <block>
            Showing 21 through 40 of 884 results.
        </block>
    <field name="vField">
        <grammar>
```

-continued

COMPUTER PROGRAM LISTING

```
<![CDATA[#JSGF V1.0;
grammar results;
public  = [select][(go | jump) to][show [details for]][pick][number]
    <items> { $=$items };
<items> =
    ...
Grammar rule elements that voice enable voice activated hyperlinks scrolled
    above the visible display screen in FIG. 7:
    (1 | Seattle's Best Coffee) {$='link-id-1'} |
    (2 | Tully's Coffee Corporation) {$='linik-id-2'} |
    (3 | All City Coffee) {$='link-id-3'} |
    (4 | Boyd Coffee Store) {$='link-id-4'} |
    ....
Some grammar rule elements that voice enable voice activated hyperlinks
    visible on the display screen in FIG 7:
    (11 | Tully's Coffee) {$='link-id-11'} |
    (12 | Tully's Coffee) {$='link-id-12'} |
    (13 | Peet's Coffee and Tea Incorporated) {$='link-id-13'} |
    (14 | Starbucks) {$='link-id-14'} |
    (18 | Caffe Ladro) {$='link-id-18'} |
    ....
Some grammar rule elements that voice enable voice activated hyperlinks
    below the display screen on FIG 7:
    (19 | Starbucks) {$='link-id-19'} |
    (20 | Starbucks) {$='link-id-20'}
    ; ]]>
    </grammar>
</field>
<filled>
    <value expr="clickSelection( )"/>
    <clear namelist="vField"/>
</filled>
</form>
<script id="onLoad" declare="declare" type="text/javascript"> /*
    Search the DOM and create a list of elements of css class "voice-links"
        with was-visible = FALSE and scrolled-off-ordinal = 0
    Mark the voice activated hyperlinks that are visible by setting was-visible
    true
    Initialize global scrolled-off-display-counter to zero
</script>
<script id="onScroll" declare="declare" type="text/javascript"> /*
    For each voice activated hyperlink:
    Determine whether the link is visible
    if the link is visible, set was-visible true and clear the scrolled past field
    if the link is not visible:
    if was-visible true and, and scrolled-off-ordinal = 0
    set scrolled-off-ordinal = scrolled-off-display-counter
    increment scrolled-off-display-counter
</script>
<script id="clickSelection( )" declare="declare" type="text/javascript"> /*
    obtain the id of the link identified by speech recognition from
        application.lastresult$.interpretation
    determine whether the returned link is ambiguous:
        for each terminal grammar element compare the text of the element
        to application.lastresult$.utterance
        if true, add the element to a temporary duplicate list
    if the returned link is not ambiguous (that is, the temporary duplicate list is
        empty), select it and activate it: that is, click the link identified by
        speech recognition
    if the returned link is ambiguous (that is, the temporary duplicate list is not
        empty):
        determine whether the link identified by speech recognition is currently
            visible to the user (on the display screen) - by calling the function
            isVisible(e) set forth below, for example ...
        if the link identified by speech recognition is visible:
            determine whether any other ambiguous links are visible,
            if no other ambiguous links are visible, select and activate the returned
                link, that is, that is, click it
        if the returned link is not visible:
            determine whether any other ambiguous links are visible,
            if yes, select and activate (click) the top one
            if no, look in the visibility record and select and activate (click) the last
                ambiguous link that was visible, that is, the link in the temporary
                duplicate list having the largest scrolled-off-ordinal
</script>
<script language="Javascript" type="text/javascript" >
    function isVisible(e) {
```

-continued

COMPUTER PROGRAM LISTING

```
        var top = getAbsoluteTop(e);
        if (top >= window.window.pageYOffset &&
        top <= window.window.pageYOffset + window.innerHeight −
        e.height)
        return true;
        else
        return false;
    }
    // The offset of an element is relative to its parent
    // so must sum the offsets of the parent hierarchy.
    function getAbsoluteTop( e ) {
        var t = e.offsetTop;
        var p = e.offsetParent;
        while (p) {
            t += p.offsetTop;
            p = p.offsetParent;
        }
        return t;
    }
</script>
<ev:listener event="load" observer="body" handler="#onLoad"
defaultAction="cancel"/>
<ev:listener event="focus" observer="body" handler="#vForm"
defaultAction="cancel"/>
<ev:listener event="scroll" observer="body" handler="#onScroll"
defaultAction="cancel"/>
</head>
<body id="body" >
  <center>
  <a id="nav-id-i" class="logo" href="index.jsp">
  <img src="img/logo.jpg"/></a>
  </center><br/>
  <table width="100%"><tr><td class="none"><i>
    coffee shops in seattle, wa</i></td></tr></table>
  <table width="100%">
  <tr>
     <td class="navl">
          <a href="index.jsp" class="navl">New Search</a>
     </td>
     <td bgcolor="#FFFFFF" class="nav">21-40
        of 884 |
        <a id="nav-id-f" href="results?s=1">First</a> |
        <a id="nav-id-p" href="results?s=1">Previous</a> |
        <a id="nav-id-n" href="results?s=41">Next</a> |
        <a id="nav-id-l" href="results?s=865">Last</a>
     </td>
     </tr>
  </table>
  <table width="100%">
  ...Table rows that are scolled above the visible screen
  <tr>
     <td bgcolor="#DDDDEE"><b>
     <a class="tb" href="details.jsp?n=1" id="link-id-1">1. Seattle's Best
         Coffee</a></b>
     <a href="http://www.starbucks.com/" id="home-id-1">
         <img class="ico" alt="URL" src="img/home.gif"/></a><br/>
     <span class="info">1600 E Olive Way, Seattle, WA</span><br/>
     <span class="info">(206) 568-5185 Distance (miles): 0.81</span></td></tr>
  <tr>
     <td bgcolor="#DDDDCC"><b>
     <a class="tb" href="details.jsp?n=2" id="link-id-2">2. Tully's Coffee
         Corporation</a></b>
     <a href="http://tullys.com/" id="home-id-2">
         <img class="ico" alt="URL" src="img/home.gif"/></a><br/>
     <span class="info">2060 Nw Market St, Seattle, WA</span><br/>
     <span class="info">(206) 781-4887 Distance (miles): 5.16</span></td></tr>
  <tr>
     <td bgcolor="#DDDDEE"><b>
     <a class="tb" href="details.jsp?n=3" id="link-id-3">3. All City
     Coffee</a></b>
     <a href="http://cloudcitycoffee.com/" id="home-id-3">
         <img class="ico" alt="URL" src="img/home.gif"/></a><br/>
     <span class="info">8801 Roosevelt Way Ne, Seattle, WA</span><br/>
     <span class="info">(206) 527-5552 Distance (miles): 5.34</span></td></tr>
  <tr>
     <td bgcolor="#DDDDCC"><b>
     <a class="tb" href="details.jsp?n=4" id="link-id-4">4. Boyd Coffee Store
```

-continued

COMPUTER PROGRAM LISTING

```
      </a></b>
   <a href="http://www.boespresso.com/" id="home-id-4">
      <img class="ico" alt="URL" src="img/home.gif"/></a><br/>
   <span class="info">204 Belmont Ave E, Seattle, WA</span><br/>
   <span class="info">(206) 322-5028 Distance (miles): 0.87</span></td></tr>
...Some table rows that are visible on the screen
<tr>
   <td bgcolor="#DDDDEE"><b>
   <a class="tb" href="details.jsp?n=11" id="link-id-11">11. Tully's Coffee
      </a></b><b/>
   <span class="info"> 1046 1st Ave, Seattle, WA</span><br/>
   <span class="info">(206) 624-5402 Distance (miles): 0.50</span></td></tr>
<tr>
   <td bgcolor="#DDDDCC"><b>
   <a class="tb" href="details.jsp?n=12" id="link-id-12">12. Tully's Coffee
      </a></b><br/>
   <span class="info">2000 1st Ave, Seattle, WA</span><br/>
   <span class="info">(206) 726-8756 Distance (miles): 0.75</span></td></tr>
<tr>
   <td bgcolor="#DDDDE"><b>
   <a class="tb" href="details.jsp?n=13" id="link-id-13"> 13. Starbucks</a></b>
   <a href="http://www.perkatorycafe.com/" id="home-id-13">
      <img class="ico" alt="URL" src="img/home.gif"/></a><br/>
   <span class="info">505 5th Ave, Seattle, WA</span><br/>
   <span class="info">(206) 262-9903 Distance (miles): 0.87</span></td></tr>
...Some table rows that are scrolled below the screen
<tr>
   <td bgcolor="#DDDDEE"><b>
   <a class="tb" href="details.jsp?n=19" id="link-id-19"> 19. Starbucks</a></b>
   <a href="http://starbucks.com/" id="home-id-19">
      <img class="ico" alt="URL" src="img/home.gif"/></a><br/>
   <span class="info">Westlake Mall #42, Seattle, WA</span><br/>
   <span class="info">(206) 283-9629 Distance (miles): 3.05</span></td></tr>
<tr>
   <td bgcolor="#DDDDCC"><b>
   <a class="tb" href="details.jsp?n=20" id="link-id-20">20. Starbucks</a></b>
<a href="http://www.tullys.com/" id="home-id-20">
      <img class="ico" alt="URL" src="img/home.gif"/></a><br/>
   <span class="info">1600 E Olive Way, Seattle, WA</span><br/>
   <span class="info">(206) 625-0600 Distance (miles): 0.44</span></td></tr>
</table>
<table width="100%">
<tr>
   <td class="navl">
      <a href="index.jsp" class="navl">New Search</a>
   </td>
   <td bgcolor="#FFFFFF" class="nav">21-40 of 884 |
      <a id="nav-id-f" href="results?s=1">First</a> |
      <a id="nav-id-p" href="results?s=1">Previous</a> |
      <a id="nav-id-n" href="results?s=41">Next</a> |
      <a id="nav-id-l" href="results?s=865">Last</a>
   </td>
   </tr>
</table>
</body>
</html>
```

What is claimed is:

1. A method of disambiguating a speech recognition grammar in a multimodal application, the multimodal application including voice activated hyperlinks, the voice activated hyperlinks being voice enabled by a speech recognition grammar comprising ambiguous terminal grammar elements, the multimodal application being operable in a multimodal browser on a multimodal device supporting multiple modes of user interaction with the multimodal device, the modes of user interaction including a voice mode and a visual mode, the multimodal browser being operatively coupled to a grammar interpreter, the method comprising:

maintaining by the multimodal browser a record of visibility of each voice activated hyperlink, the record of visibility including current visibility and past visibility on a display of the multimodal device of each voice activated hyperlink, the record of visibility further including an ordinal indication, for each voice activated hyperlink scrolled off display, of the sequence in which each such voice activated hyperlink was scrolled off display;

recognizing by the multimodal browser speech from a user matching an ambiguous terminal element of the speech recognition grammar; and selecting by the multimodal browser a voice activated hyperlink for activation, the selecting being carried out in dependence upon the recognized speech and the record of visibility.

2. The method of claim 1 wherein:

the multimodal application comprises an X+V page that includes the voice activated hyperlinks; and each voice activated hyperlink further comprises an XHTML anchor element bound to a terminal element of the grammar by a value of an identifying attribute of the anchor element, the value of the identifying attribute being unique within the X+V page.

3. The method of claim 1 wherein:
the record of past visibility further comprises a boolean data element having a value of TRUE or FALSE, TRUE indicating that a voice activated hyperlink was previously visible on the display, FALSE indicating that a voice activated hyperlink was not previously visible on the display; and
the record of current visibility further comprises a data element having ordinal values, the value zero indicating that a voice activated hyperlink is visible, other values taken from a scrolled-off-display counter indicating the sequence in which a voice activated hyperlink was scrolled off display.

4. The method of claim 1 wherein maintaining a record of visibility of each voice activated hyperlink, the record of visibility further including an ordinal indication, for each voice activated hyperlink scrolled off display, of the sequence in which each such voice activated hyperlink was scrolled off display, further comprises:
creating by the multimodal browser a scrolled-off-display counter, the scrolled-off-display counter being initialized to zero; and
incrementing the scrolled-off-display counter when a visible voice activated hyperlink is scrolled off display.

5. The method of claim 1 wherein maintaining a record of visibility further comprises carrying out the following steps for each voice activated hyperlink on each scroll of the display:
if the voice activated hyperlink scrolled into visibility on the display, recording that the voice activated hyperlink is currently visible and recording that the voice activated hyperlink was previously visible; and
if the voice activated hyperlink scrolled out of visibility off the display, recording that the voice activated hyperlink is not visible and recording a current value of a scrolled-off-display counter as the ordinal indication of the sequence in which the voice activated hyperlink scrolled off display.

6. The method of claim 1 wherein selecting by the multimodal browser a voice activated hyperlink for activation further comprises:
identifying as ambiguous hyperlinks all voice activated hyperlinks that are voice enabled by grammar elements that are ambiguous with respect to the matched ambiguous terminal element of the speech recognition grammar;
if only one ambiguous hyperlink is visible, selecting for activation the only visible ambiguous hyperlink;
if no ambiguous hyperlink is visible and only one ambiguous hyperlink was previously visible, selecting for activation the ambiguous hyperlink that was previously visible; and
if no ambiguous hyperlink is visible and more than one ambiguous hyperlink was previously visible, selecting for activation the most recently visible ambiguous hyperlink.

7. Apparatus for disambiguating a speech recognition grammar in a multimodal application, the multimodal application including voice activated hyperlinks, the voice activated hyperlinks being voice enabled by a speech recognition grammar comprising ambiguous terminal grammar elements, the multimodal application being operable in a multimodal browser on a multimodal device supporting multiple modes of user interaction with the multimodal device, the modes of user interaction including a voice mode and a visual mode, the multimodal browser being operatively coupled to a grammar interpreter, the apparatus comprising a computer processor and a computer memory operatively coupled to the computer processor, the computer memory having disposed within it computer program instructions capable of:
maintaining by the multimodal browser a record of visibility of each voice activated hyperlink, the record of visibility including current visibility and past visibility on a display of the multimodal device of each voice activated hyperlink, the record of visibility further including an ordinal indication, for each voice activated hyperlink scrolled off display, of the sequence in which each such voice activated hyperlink was scrolled off display;
recognizing by the multimodal browser speech from a user matching an ambiguous terminal element of the speech recognition grammar; and
selecting by the multimodal browser a voice activated hyperlink for activation, the selecting being carried out in dependence upon the recognized speech and the record of visibility.

8. The apparatus of claim 7 wherein:
the multimodal application comprises an X+V page that includes the voice activated hyperlinks; and
each voice activated hyperlink further comprises an XHTML anchor element bound to a terminal element of the grammar by a value of an identifying attribute of the anchor element, the value of the identifying attribute being unique within the X+V page.

9. The apparatus of claim 7 wherein:
the record of past visibility further comprises a Boolean data element having a value of TRUE or FALSE, TRUE indicating that a voice activated hyperlink was previously visible on the display, FALSE indicating that a voice activated hyperlink was not previously visible on the display; and
the record of current visibility further comprises a data element having ordinal values, the value zero indicating that a voice activated hyperlink is visible, other values taken from a scrolled-off-display counter indicating the sequence in which a voice activated hyperlink was scrolled off display.

10. The apparatus of claim 7 wherein maintaining a record of visibility of each voice activated hyperlink, the record of visibility further including an ordinal indication, for each voice activated hyperlink scrolled off display, of the sequence in which each such voice activated hyperlink was scrolled off display, further comprises:
creating by the multimodal browser a scrolled-off-display counter, the scrolled-off-display counter being initialized to zero; and
incrementing the scrolled-off-display counter when a visible voice activated hyperlink is scrolled off display.

11. The apparatus of claim 7 wherein maintaining a record of visibility further comprises carrying out the following steps for each voice activated hyperlink on each scroll of the display:
if the voice activated hyperlink scrolled into visibility on the display, recording that the voice activated hyperlink is currently visible and recording that the voice activated hyperlink was previously visible; and
if the voice activated hyperlink scrolled out of visibility off the display, recording that the voice activated hyperlink is not visible and recording a current value of a scrolledoff-display counter as the ordinal indication of the sequence in which the voice activated hyperlink scrolled off display.

12. The apparatus of claim 7 wherein selecting by the multimodal browser a voice activated hyperlink for activation further comprises:
identifying as ambiguous hyperlinks all voice activated hyperlinks that are voice enabled by grammar elements that are ambiguous with respect to the matched ambiguous terminal element of the speech recognition grammar;
if only one ambiguous hyperlink is visible, selecting for activation the only visible ambiguous hyperlink;
if no ambiguous hyperlink is visible and only one ambiguous hyperlink was previously visible, selecting for activation the ambiguous hyperlink that was previously visible; and
if no ambiguous hyperlink is visible and more than one ambiguous hyperlink was previously visible, selecting for activation the most recently visible ambiguous hyperlink.

13. A computer program product for disambiguating a speech recognition grammar in a multimodal application, the multimodal application including voice activated hyperlinks, the voice activated hyperlinks being voice enabled by a speech recognition grammar comprising ambiguous terminal grammar elements, the multimodal application being operable in a multimodal browser on a multimodal device supporting multiple modes of user interaction with the multimodal device, the modes of user interaction including a voice mode and a visual mode, the multimodal browser being operatively coupled to a grammar interpreter, the computer program product disposed upon at least one recordable computer-readable medium, the computer program product comprising computer program instructions capable of:
maintaining by the multimodal browser a record of visibility of each voice activated hyperlink, the record of visibility including current visibility and past visibility on a display of the multimodal device of each voice activated hyperlink, the record of visibility further including an ordinal indication, for each voice activated hyperlink scrolled off display, of the sequence in which each such voice activated hyperlink was scrolled off display;
recognizing by the multimodal browser speech from a user matching an ambiguous terminal element of the speech recognition grammar; and
selecting by the multimodal browser a voice activated hyperlink for activation, the selecting being carried out in dependence upon the recognized speech and the record of visibility.

14. The computer program product of claim 13 wherein:
the multimodal application comprises an X+V page that includes the voice activated hyperlinks; and
each voice activated hyperlink further comprises an XHTML anchor element bound to a terminal element of the grammar by a value of an identifying attribute of the anchor element, the value of the identifying attribute being unique within the X+V page.

15. The computer program product of claim 13 wherein:
the record of past visibility further comprises a boolean data element having a value of TRUE or FALSE, TRUE indicating that a voice activated hyperlink was previously visible on the display, FALSE indicating that a voice activated hyperlink was not previously visible on the display; and
the record of current visibility further comprises a data element having ordinal values, the value zero indicating that a voice activated hyperlink is visible, other values taken from a scrolled-off-display counter indicating the sequence in which a voice activated hyperlink was scrolled off display.

16. The computer program product of claim 13 wherein maintaining a record of visibility of each voice activated hyperlink, the record of visibility further including an ordinal indication, for each voice activated hyperlink scrolled off display, of the sequence in which each such voice activated hyperlink was scrolled off display, further comprises:
creating by the multimodal browser a scrolled-off-display counter, the scrolled-off-display counter being initialized to zero; and
incrementing the scrolled-off-display counter when a visible voice activated hyperlink is scrolled off display.

17. The computer program product of claim 13 wherein maintaining a record of visibility further comprises carrying out the following steps for each voice activated hyperlink on each scroll of the display:
if the voice activated hyperlink scrolled into visibility on the display, recording that the voice activated hyperlink is currently visible and recording that the voice activated hyperlink was previously visible; and
if the voice activated hyperlink scrolled out of visibility off the display, recording that the voice activated hyperlink is not visible and recording a current value of a scrolled-off-display counter as the ordinal indication of the sequence in which the voice activated hyperlink scrolled off display.

18. The computer program product of claim 13 wherein selecting by the multimodal browser a voice activated hyperlink for activation further comprises:
identifying as ambiguous hyperlinks all voice activated hyperlinks that are voice enabled by grammar elements that are ambiguous with respect to the matched ambiguous terminal element of the speech recognition grammar;
if only one ambiguous hyperlink is visible, selecting for activation the only visible ambiguous hyperlink;
if no ambiguous hyperlink is visible and only one ambiguous hyperlink was previously visible, selecting for activation the ambiguous hyperlink that was previously visible; and
if no ambiguous hyperlink is visible and more than one ambiguous hyperlink was previously visible, selecting for activation the most recently visible ambiguous hyperlink.

* * * * *